(12) United States Patent
Hsu et al.

(10) Patent No.: US 10,176,284 B2
(45) Date of Patent: Jan. 8, 2019

(54) SEMICONDUCTOR CIRCUIT DESIGN AND MANUFACTURE METHOD (71) Applicant: TAIWAN SEMICONDUCTOR MANUFACTURING COMPANY LTD., Hsinchu (TW)

(72) Inventors: Li-Chung Hsu, Hsinchu (TW); Tai-Yu Cheng, Pingtung (TW); Sung-Yen Yeh, Pingtung County (TW); King-Ho Tam, Hsinchu County (TW); Yen-Pin Chen, Taipei (TW); Chung-Hsing Wang, Hsinchu County (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 168 days.

(21) Appl. No.: 15/282,287

(22) Filed: Sep. 30, 2016

(65) Prior Publication Data
US 2018/0096087 A1 Apr. 5, 2018

(51) Int. Cl.
G06F 17/50 (2006.01)

(52) U.S. Cl.
CPC ...... *G06F 17/5036* (2013.01); *G06F 17/5022* (2013.01); *G06F 17/5081* (2013.01); *G06F 2217/78* (2013.01)

(58) Field of Classification Search
CPC ............. G06F 17/5022; G06F 17/5081; G06F 17/5036; G06F 2217/78
USPC .................... 716/106, 111, 136, 112; 703/16
See application file for complete search history.

(56) References Cited

U.S. PATENT DOCUMENTS

| 5,943,489 | A | * | 8/1999 | Shiratori | ............. | G06F 17/5022 |
| | | | | | | 703/16 |
| 8,601,416 | B2 | | 12/2013 | Kuo et al. | | |
| 8,762,900 | B2 | | 6/2014 | Shin et al. | | |
| 8,775,993 | B2 | | 7/2014 | Huang et al. | | |
| 8,887,116 | B2 | | 11/2014 | Ho et al. | | |
| 8,943,445 | B2 | | 1/2015 | Chen et al. | | |
| 8,990,762 | B2 | | 3/2015 | Yuh et al. | | |
| 9,081,933 | B2 | | 7/2015 | Liu et al. | | |
| 9,183,341 | B2 | | 11/2015 | Chen et al. | | |
| 9,213,790 | B2 | | 12/2015 | Hsu et al. | | |
| 10,061,875 | B2 | * | 8/2018 | Ramsay | ................. | G01V 11/00 |
| 2001/0034595 | A1 | * | 10/2001 | Yamaguchi | ......... | G06F 17/5022 |
| | | | | | | 703/19 |

(Continued)

*Primary Examiner* — Phallaka Kik
(74) *Attorney, Agent, or Firm* — WPAT, P.C., Intellectual Property Attorneys; Anthony King (57) ABSTRACT A method performed by a processor, the method including preparing a netlist describing a first circuit including an active component; obtaining an original electrical characteristic of the active component, wherein an electrical characteristic of the active component is the original electrical characteristic in a condition that the active component has not been operated; obtaining an aged data describing a variation in the original electrical characteristic, wherein the variation is caused by operating the first circuit under a first mode and a second mode different from the first mode during a time period; providing a simulation result by simulating, based on an aged electrical characteristic, the first circuit operating under the first mode and the second mode during the time period, wherein the aged electrical characteristic is a combination of the original electrical characteristic and the variation.

20 Claims, 6 Drawing Sheets (56) References Cited

U.S. PATENT DOCUMENTS

| | | | |
|---|---|---|---|
| 2004/0158809 A1* | 8/2004 | Kashimoto | G03F 7/70466 716/52 |
| 2004/0216067 A1* | 10/2004 | Tanaka | G06F 17/5022 716/126 |
| 2010/0262414 A1* | 10/2010 | Joshi | G06F 17/504 703/14 |
| 2011/0035714 A1* | 2/2011 | Foreman | G06F 17/5031 716/108 |
| 2011/0173432 A1* | 7/2011 | Cher | G01R 31/31725 713/100 |
| 2011/0219208 A1* | 9/2011 | Asaad | G06F 15/76 712/12 |
| 2014/0237435 A1 | 8/2014 | Chen et al. | |
| 2014/0304670 A1 | 10/2014 | Su et al. | |
| 2015/0278419 A1 | 10/2015 | Yang et al. | |
| 2015/0370937 A1 | 12/2015 | Liu et al. | |
| 2015/0370945 A1 | 12/2015 | Lee | |
| 2016/0033953 A1* | 2/2016 | Nakagawa | G05B 19/056 700/29 |
| 2018/0210479 A1* | 7/2018 | Meagher | H02J 3/38 |

* cited by examiner

SEMICONDUCTOR CIRCUIT DESIGN AND MANUFACTURE METHOD

BACKGROUND

System-on-chip (SoC) technology integrates multiple functional blocks on a single silicon chip. The multiple functional blocks may include digital circuits, analog circuits, mixed-signal circuits or any combination thereof. SoC technology reduces development cycle and manufacture costs and increases product reliability, functionality and performance.

However, an SoC chip is relatively complicated. Such a complicated chip having various types of functional blocks demands a thorough reliability analysis before going through an expensive and time-consuming fabrication process. Semiconductor aging has emerged as a major factor for SoC chip's reliability. Aging induced defects include Hot Carrier Injection (HCI), which relates to the change in electrons/holes' mobility; Electron-Migration (EM), which relates to the gradual displacement of ions in a conductor as a result of current flowing through the conductor; Negative Bias Temperature Instability (NBTI), which relates to a shift of a threshold voltage of a transistor; and Time Dependent Dielectric Breakdown (TDDB), which relates to the damage caused to the gate oxide region of a transistor. In short, HCI, EM, NBTI and TDDB are major mechanisms of device degradation due to aging effects.

Conventionally, design reliability margin is given by the worst-case assumption. That is, the user usage model of a design is assumed to be operated at high voltage and temperature over expected lifetime. As a result, over design issues in early development stage are incurred. Simulation tools such as Simulation Program with Integrated Circuits Emphasis (SPICE) can be used to simulate aging induced defects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments or examples, for implementing different features of various embodiments. Specific examples of components and arrangements are described below to simplify the present disclosure. An inventive concept may, however, be embodied in many different forms and should not be construed as being limited to the embodiments set forth herein, rather, these embodiments are provided so that this description will be thorough and complete, and will fully convey an inventive concept to those of ordinary skill in the art. It will be apparent, however, that one or more embodiments may be practiced without these specific details In addition, the present disclosure may repeat reference numerals and/or letters in the various examples. This repetition is for the purpose of simplicity and clarity and does not in itself dictate a relationship between the various embodiments and/or configurations discussed.

Figure 1:
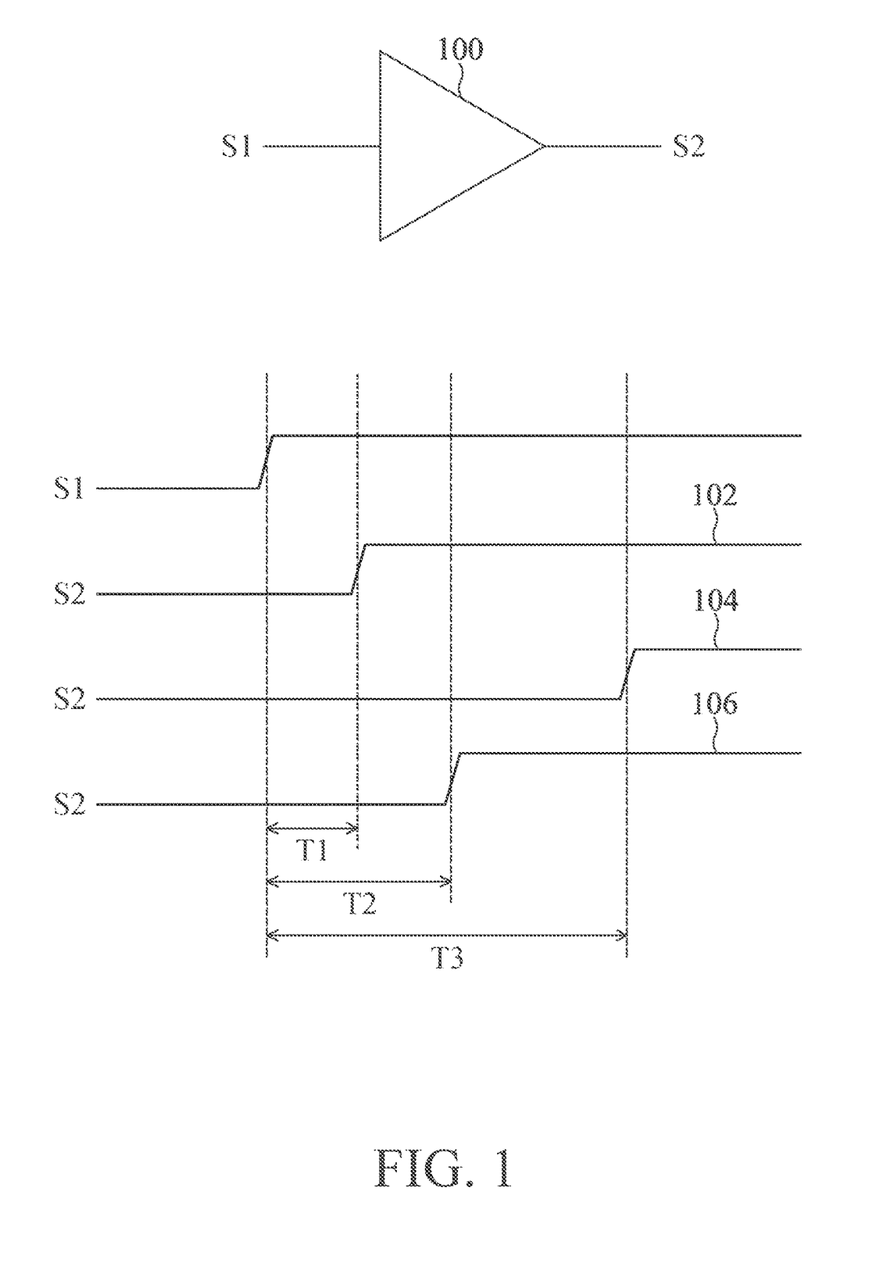
FIG. 1 illustrates the concept of an optimized estimate of electrical parameters degradation due to device aging, in accordance with some embodiments of the present disclosure.

FIG. 1 illustrates the concept of an optimized estimate of electrical characteristic degradation due to device aging, in accordance with some embodiments of the present disclosure. Referring to FIG. 1, a semiconductor device 100 receives an input signal S1 and outputs an output signal S2. In the present example, the semiconductor device 100 is a buffer. However, the present disclosure is not limited thereto. The semiconductor device 100 may be an inverter, a logic gate or any combination thereof.

A curve 102 represents a waveform of the output signal S2 when the semiconductor device 100 is a fresh device. A fresh device refers to a semiconductor device that is just manufactured from factories and has not been operated. Alternatively, a fresh device refers to a semiconductor device whose electrical characteristic has not been affected by aging effect. In other words, the electrical characteristic has not been degraded. As shown in FIG. 1, T1 represents the propagation delay between the input signal S1 and the output signal S2.

Propagation delay in the semiconductor device 100 may increase due to device aging. In view of aging effects, in the simulation, the worst case values are used to estimate electrical characteristics. As such, a curve 104 represents the output signal S2 in the worst-case values condition, and T3 represents the propagation delay between the input signal S1 and the output signal S2 in this condition.

As described above, application of the worst-case values may result in a pessimistic estimate because such approaches do not consider usage information. In contrast, a curve 106 represents the output signal S2 in a condition that the usage information is considered. The usage information includes some operating conditions such as voltage and temperature variations and operating time of each of a plurality of modes. As shown in FIG. 1, a curve 106 represents that the output signal S2 is in a condition that the usage information is considered, and T2 represents the propagation delay between the input signal S1 and the output signal S2. Compared with the propagation delay T3, the propagation delay T2 is relatively low. Therefore, by considering the usage information, which will be described in detail below, the requirement of aging stress applied to timing library characterization can effectively be optimized. It should be noted that the propagation delay between an input signal and an output signal used in the previous example are selected purely for demonstration purposes and are not intended to limit the various embodiments to any particular simulation results. For example, the simulation results can include power consumption.

Figure 2:
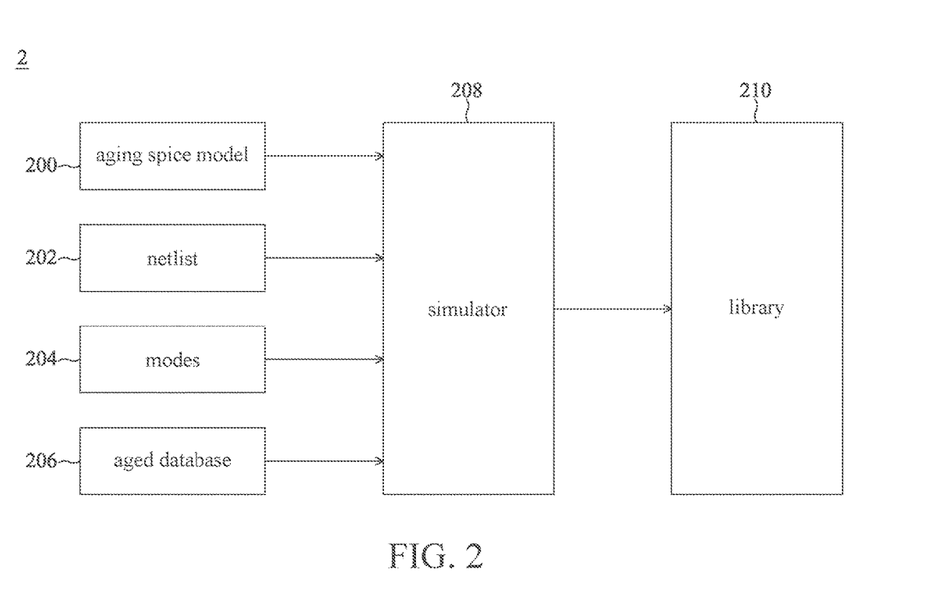
FIG. 2 is a work flow of a simulation process of a semiconductor device design system, in accordance with some embodiments of the present disclosure.

FIG. 2 is a workflow of a simulation process of a semiconductor device design system 2, in accordance with some embodiments of the present disclosure. Referring to FIG. 2, the semiconductor device design system 2 includes an aging spice model 200, a netlist 202, modes 204, an aged database 206, a simulator 208 and a library 210.

In the aging spice model 200, an original electrical characteristic of an active component is prepared. The original electrical characteristic can be obtained from the aging spice model 200. An electrical characteristic of the active component is the original electrical characteristic in a condition that the active component has not been operated and has not been affected by aging effect. In other words, the electrical characteristic has not been degraded. The active component may include metal-oxide semiconductor (MOS) transistors, n-type MOS (NMOS) transistors, or p-type MOS (PMOS) transistors. The electrical characteristic may include threshold voltage, or saturation current.

The netlist 202 is prepared, and describes a first circuit extracted from a layout of a second circuit. The first circuit includes the second circuit and parasitic components of the second circuit, and the second circuit includes the active component.

The modes 204 include a plurality of mode to be operated during a time period. For example, the modes 204 include a first mode and a second mode to be operated during such as 10 years of the time period. The second mode is different from the first mode In an embodiment, the first mode includes a first voltage level and the second mode includes a second voltage level lower than the first voltage level. For example, the first mode indicates that the first circuit is to be operated at 100° C., and 1.2 volts (V) of the first voltage level. The second mode indicates that the first circuit is to be operated at 25° C. and 0.6 V of the second voltage level. Although in the previous example only two operation environments (temperature and voltage) are considered, the present disclosure is not limited thereto. The operation environment may include operation frequency, other information, or a combination thereof. Moreover, the modes 204 include an instruction including information on a path indicating where to access the variation of the electrical characteristic.

In the aged database 206, an aged data is prepared. The aged data is obtained from the aged database 206. The aged data describes a variation in the original electrical characteristic. The variation is caused by operating the first circuit under the first mode and the second mode for the time period. The aged data is stored in the aged database 206, and can be accessed in response to the fact that it is desired to simulate an operation of the first circuit under the first mode and the second mode for the time period.

In an embodiment, the first circuit exhibits a first performance after the first circuit operates under the first mode and the second mode for a time period, and the first circuit exhibits a second performance after the first circuit operates under a third mode and a fourth mode for a time period. The first performance is different from the second performance. In an embodiment, the first performance is worse than the second performance. For example, the highest voltage level in the first mode and the second mode is higher than that in the third mode and the fourth mode, and therefore the first performance is worse than the second performance. For example, the first circuit exhibits the first performance after a device including the first circuit performs video software, such as YouTube or Video game software for a time period; and the first circuit exhibits the second performance after the device performs communication software, such as LINE or WhatsApp for a time period. The above description is intended to explain that the aged database includes a plurality of aged data. Each of the aged data corresponds to a performance. By using the aged database of the present disclosure, the aged circuit behavior under different performances can be predicted. In practice, a voltage applied to first circuit may not be kept unchanged. For example, to enhance the performance over runtime, the voltage can be increased. Alternatively, to reduce power consumption over runtime, the voltage can be decreased. With the aged data, the aged circuit behavior can be predicted relatively accurate. As a result, margin can be further reduced (or relaxed). Power consumption, circuit performance and consumed area can be optimized in design phase.

The simulator 208 is configured to perform simulation on an operation of the first circuit according to the original electrical characteristic from the aging spice mode 200, the netlist 202, the modes 204 and the aged data from the aged database 206. After completion of the simulation, the simulator 208 provides simulation results to the library 210. Moreover, the simulator 208 is configured to access the aged data from the aged database 206 according to the path in the instruction. The simulator 108 may include one or more electronic design automation (EDA) tools for testing a design of a semiconductor device before manufacturing the same device. For example, the EDA tools include one or more sets of executable instructions for execution by a processor or controller, or a programmed computer to perform the indicated functionality. Alternatively, the simulator 108 may be a simulation program with integrated circuits emphasis (SPICE).

In an embodiment, in order to obtain a variety of simulation result under different load capacitance values and different slews of a voltage, the modes 204 further describe a first load capacitance value of the first circuit, a second load capacitance vale of the first circuit, a first slew of a voltage at which the first circuit operates, and a second slew of the voltage at which the first circuit operates In this way, the simulator 208 provides a first simulation result by simulating, based on the first load capacitance value and the first slew, the first circuit operating under the first mode and the second for the time period. Similarly, the simulator 208 provides a second simulation result by simulating, based on the first load capacitance value and the second slew, the first circuit operating under the first mode and the second for the time period. Also, the simulator 208 provides a third simulation result by simulating, based on the second load capacitance value and the first slew, the first circuit operating under the first mode and the second for the time period. Additionally, the simulator 208 provides a fourth simulation result by simulating, based on the second load capacitance value and the second slew, the first circuit operating under the first mode and the second for the time period. Afterwards, the design of the first circuit is tested based on each of the first simulation result, the second simulation result, the third simulation result and the fourth simulation result In response to different load capacitance values and slews, the first circuit exhibits different performances. In this way, the first circuit can be arranged in the appropriate operation environment so that the first circuit can provide the best performance.

In some embodiment, the semiconductor device design system 2 further includes a library characterization tool. The library characterization tool is configured to integrate information, respectively described in the aging spice model 200, the netlist 202, the modes 204 and the aged database 206, into a spice netlist. The simulator 208 receives the spice netlist, and simulates accordingly.

Figure 3:
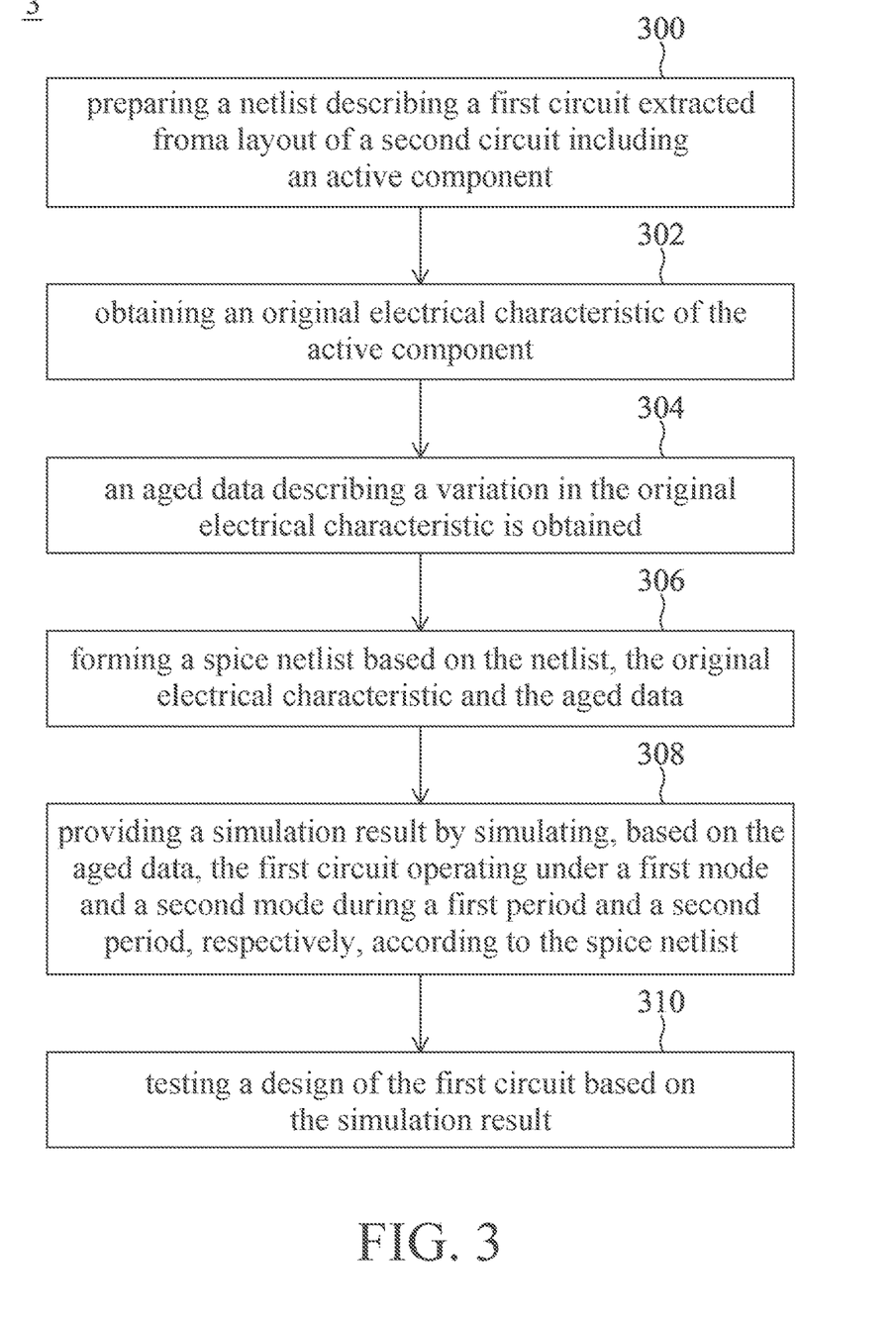
FIG. 3 is a flow chart of a design method, in accordance with some embodiments of the present disclosure.

FIG. 3 is a flow chart of a design method 3, in accordance with some embodiments of the present disclosure. Referring to FIG. 3, in operation 300, the netlist 202 is prepared. The netlist 202 describes a first circuit extracted from a layout of a second circuit. The second circuit may be a buffer. Since the first circuit is extracted from the layout of the second circuit, the first circuit includes the second circuit and parasitic components of the second circuit. Moreover, the second circuit includes an active component, such as an NMOS transistor.

In operation 302, the original electrical characteristic of the active component is obtained from the aging spice model 200. The electrical characteristic of the active component is the original electrical characteristic in a condition that the active component has not been operated, and the electrical characteristic has not been affected by aging effect.

In operation 304, an aged data describing a variation in the original electrical characteristic is obtained from the aged database 206. The variation is caused by operating the first circuit under the first mode and the second mode different from the first mode for a time period. Generation of the aged data will be described in detail with reference to FIG. 4. In operation 306, a spice netlist is formed based on the netlist, the original electrical characteristic and the aged data.

In operation 308, a simulation result is provided by simulating, based on the aged data and the original electrical characteristic, the first circuit operating under the first mode and the second mode for a first period and a second period, respectively, according to the spice netlist. In operation 310, a design of the first circuit is tested based on the simulation result.

In the present disclosure, the variation in the electrical characteristic is caused by operating the first circuit under two different modes, the first mode and the second mode, during the time period, which means that the usage information has been considered. For example, the first mode is an overdrive mode, and therefore the operation voltage and the temperature are relatively higher. The second mode is a normal operation mode, and therefore the operation and the temperature are relatively lower. During a period of time, such as 10 years, the normal operation mode and the overdrive mode exists.

If only one of two modes is considered, a variation in the electrical characteristic is relatively not accurate. In some existing approaches, only one of a plurality of modes is considered. For example, since a operation voltage and a temperature in the overdrive mode are higher than that in the normal operation mode and hence the operation environment is the relatively worse, only the overdrive mode is selected to be considered. Specifically, the simulation is performed based on, for example, a combination of the original electrical characteristic and the variation in the electrical characteristic. However, the variation is caused by operating a circuit only under the overdrive mode.

Moreover, in some existing approaches, it is assumed that a circuit operates under the overdrive mode and the normal operation mode for 10 years. Specifically, the circuit operates under the overdrive mode for 7 years of 10 years, and under the normal operation mode for 3 years of 10 years. In some existing approaches, the simulation is performed based on a combination of the original electrical characteristic and a variation in the electrical characteristic. However, the variation is caused by operating the circuit under the overdrive mode for 10 years rather than 7 years. In short, the existing approaches do not take usage information into consideration. Only one case, usually the worst case, is considered. Therefore, performance of the circuit cannot be optimized.

Moreover, in the present disclosure, the aged data in the aged database 206 is storable and therefore can be prepared in advance. Since the aged data obtained by an aging simulation can be prepared in advance, when the simulator 208 performs the simulation, there is no need to perform the aging simulation again. Efficiency of simulation is therefore enhanced.

Figure 4:
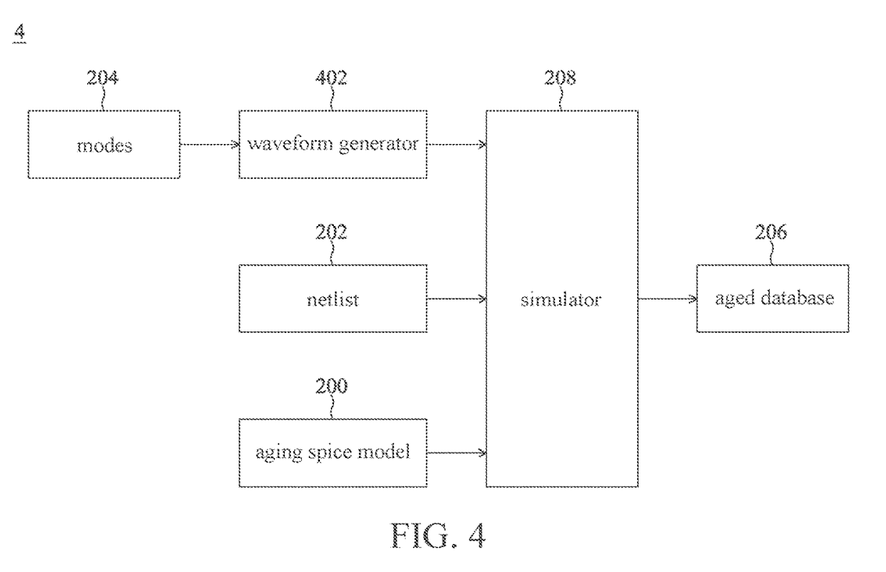
FIG. 4 is a workflow of a simulation process of a semiconductor device design system, in accordance with some embodiments of the present disclosure.

FIG. 4 is a workflow of a simulation process of a semiconductor device design system 4, in accordance with some embodiments of the present disclosure. Referring to FIG. 4, the semiconductor device design system 4 includes a waveform generator 402.

The waveform generator 402 is configured to receive the modes 204 mentioned above. The modes 204 including the first mode and the second mode for operating the first circuit during the time period are prepared. The first mode is different from the second mode. The first circuit is extracted from a layout of a second circuit. The first circuit includes the second circuit and parasitic components of the second circuit. The second circuit includes the active component. The netlist 202 describing the first circuit is prepared. Furthermore, the waveform generator 402 is configured to generate a waveform by integrating the first mode and the second mode, which will be described in detail below. For example, the first mode indicates that the first circuit is to be operated at 100° C. and 1.2 V. The second mode indicates that the first circuit is to be operated at 25° C. and 0.6 V. Accordingly, the waveform generator 402 generates a waveform includes a first mode waveform and a second mode waveform. The first mode waveform is followed by the second waveform. The first mode waveform includes a pulse of which magnitude ranging from 0 V and 1.2 V. The temperature of 100° C. would recorded in the first mode waveform in some ways. Similarly, the second mode waveform includes a pulse of which magnitude ranging from 0 V and 0.6 V. In an embodiment, the first mode further includes a first operation ratio of such as 70% The second mode further includes a second operation ratio of such as 30%. Accordingly, the first mode waveform occupies 70% of the waveform generated by the waveform generator 402; and the second mode waveform occupies 30% of the waveform generated by the waveform generator 402.

In the aging spice model 200, an original electrical characteristic of the active component is prepared. That is, the original electrical characteristic is obtained from the aging spice model 200. The electrical characteristic of the active component is the original electrical characteristic in a condition that the active component has not been operated, and the electrical characteristic of the active component has not affected by aging effect.

Additionally, in the aging spice model 200, a plurality of data is obtained. The data each describes a variation in the original electrical characteristic, wherein the variation is caused by operating a circuit under a certain mode. The certain mode may include a certain operation voltage, a certain temperature and a certain operation time. For example, when the circuit operates at 25 degrees Celsius and 1.2 V for 10 years of an operation time, a variation (or shift) in the threshold voltage of the active component corresponding to 25 degrees Celsius, 1.2 V and 10 years is obtained. Alternatively, when the circuit is operated at 25° C. and 1.5 V for 10 years of an operation time, another variation (or shift) in the threshold voltage of the active component corresponding to 25° C., 1.5 V and 10 years is obtained. In the present embodiment, a first aged data describing a first variation in the original electrical characteristic is prepared in the aging spice model 200. The first variation is caused by operating, based on the original electrical characteristic, the first circuit under the first mode during the time period. A second aged data describing a second variation in the original electrical characteristic is also prepared in the aging spice model 200. The second variation is caused by operating, based on the original electrical characteristic and the first variation, the first circuit under the second mode during the time period.

The simulator 208 provides an aged data by simulating, based on the first aged data and the second aged data, the first circuit operating under the first mode and the second mode during the time period. The aged data describes a variation in the original electrical characteristic. The variation is caused by operating the first circuit under the first mode and the second mode during the time period. Specifically, the waveform generated by the waveform generator 402 is fed into input ports of the first circuit described in the netlist 202. The electrical characteristic of the active component in the first circuit is provided by the aging spice model 200. The aged database 206 collects the data provided by the simulator 208.

In operation, the first mode includes a first operation voltage, temperature and a first operation ratio in a time axis and the second mode includes a second operation voltage, temperature and a second operation ratio in a time axis. In an embodiment, the first aged data is obtained according to the first operation voltage, the first operation ratio, the time period and the original electrical characteristic. The second aged data is obtained according to the second operation voltage, the second operation ratio, the time period, the original electrical characteristic and the first aged data. For the sake of simplifying the description, factors related to an electrical characteristic, such as the original electrical characteristic and the first aged data, is omitted. For example, the first operation voltage is 1.2 V and the first operation ratio is 70%. Furthermore, the second operation voltage is 0.6 V and the second operation ratio is 30%. It is assumed that the simulator 208 is instructed to simulate the first circuit at 10 years. In this case, the first aged data is prepared according to the first operation voltage of 1.2 V and 7 years (=10 years×70%), and the second aged data is prepared according to the second operation voltage of 0.6 V and 3 years (=10 years×30%). In the present example, only two parameters (operation voltages and operation ratios) are used to obtain the first aged data and the second aged data. However, the present disclosure is not limited thereto. The first aged data and the second aged data can be obtained further according to other information, or a combination thereof.

As mentioned above the aged data in the aged database 206 can be used to optimize aging margin requirement and thus the performance of the first circuit. Moreover, the aged data in the aged database 206 is storable and therefore can be prepared in the procedure shown in FIG. 4 in advance. Efficiency of simulation is therefore enhanced.

Figure 5:
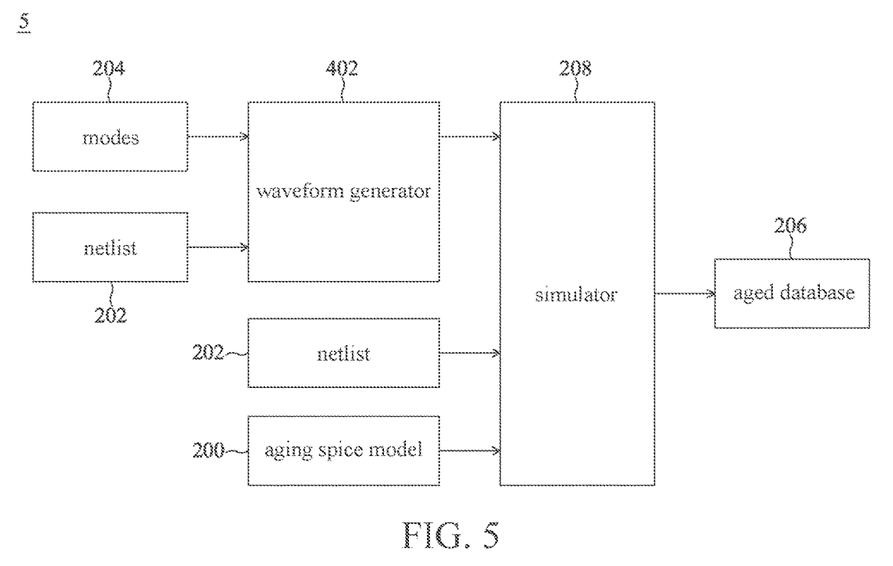
FIG. 5 is a workflow of a simulation process of a semiconductor device design system, in accordance with some embodiments of the present disclosure.

FIG. 5 is a workflow of a simulation process of a semiconductor device design system 5, in accordance with some embodiments of the present disclosure. Referring to FIG. 5, the semiconductor device design system 5 is similar to the semiconductor device design system 4 except that, for example, in the semiconductor device design system 5, the waveform generator 402 not only receives the modes 204 but also the netlist 202. Specifically, the waveform generator 402 determines the amount of input ports of the first circuit according to the netlist, and generates the same amount of waveforms as the amount of input ports. For example, the netlist 202 describes the first circuit including two input ports, a first input port and a second input port. In this case, the waveform generator 402 generates two waveforms, a first waveform and a second waveform In an embodiment, the first waveform is generated by integrating the first mode and the second mode. The second waveform is generated by dividing the first waveform. In another embodiment, the second waveform is generated by multiplying the first waveform. The simulator 208 provides the aged data by simulating, with the first waveform fed into the first input port and the second waveform fed into the second input port, the first circuit operating under the first mode and the second mode during the time period.

A waveform received by a single input port has two state, logic "1" and logic "0." When there are two input ports, there are four operation scenarios, 00, 01, 10 and 11. Therefore, to ensure that all of the four scenarios are simulated, it is required to perform simulation based on two waveforms, and one of the two waveforms is generated by for example either dividing or multiplying another waveform. In this way, with the first waveform fed into the first input port and the second waveform fed into the second input port, all of the four scenarios are simulated. The aged data provided by the simulator 208 is relatively accurate.

Figure 6:
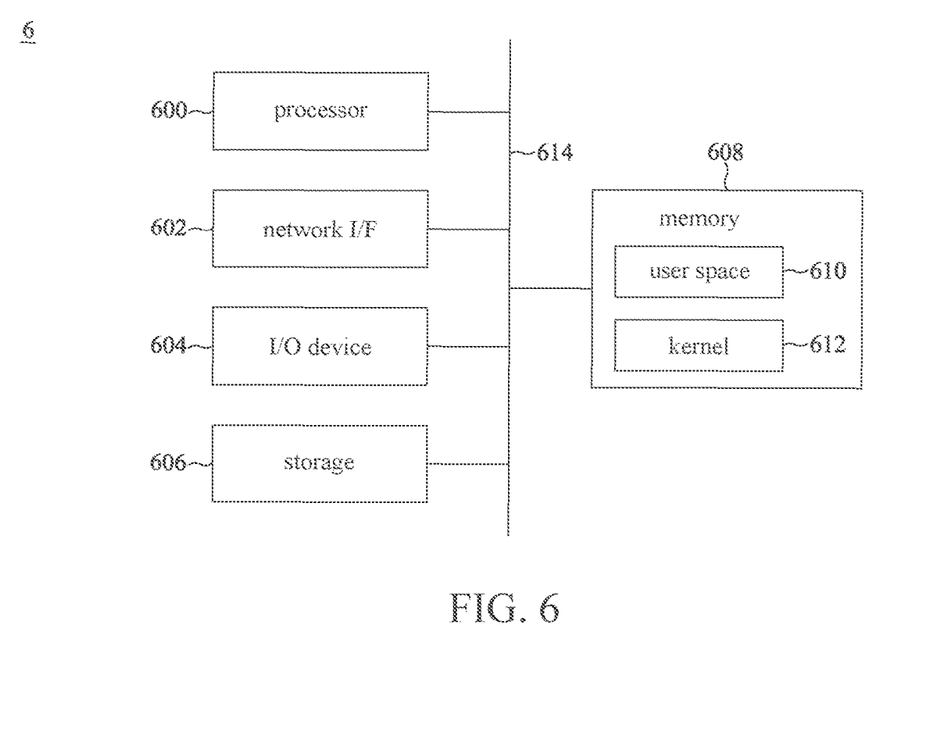
FIG. 6 is a block diagram of a computer system in accordance with some embodiments.

FIG. 6 is a block diagram of a computer system 6 in accordance with some embodiments. One or more of the tools and/or systems and/or operations described with respect to FIGS. 2-5 is realized in some embodiments by one or more computer systems 6 of FIG. 6. The system 6 comprises a processor 600, a memory 608, a network interface (I/F) 602, a storage 606, an input/output (I/O) device 604 communicatively coupled via a bus 614 or other interconnection communication mechanism.

The memory 608 comprises, in some embodiments, a random access memory (RAM) and/or other dynamic storage device and/or read only memory (ROM) and/or other static storage device, coupled to the bus 614 for storing data and/or instructions to be executed by the processor 600, e.g., kernel 612, user space 610, portions of the kernel and/or the user space, and components thereof. The memory 608 is also used, in some embodiments, for storing temporary variables or other intermediate information during execution of instructions to be executed by the processor 600.

In some embodiments, a storage device 606, such as a magnetic disk or optical disk, is coupled to the bus 614 for storing data and/or instructions, e.g., kernel 612, user space 610, etc. The I/O device 604 comprises an input device, an output device and/or a combined input/output device for enabling user interaction with the system 6. An input device comprises, for example, a keyboard, keypad, mouse, trackball, trackpad, and/or cursor direction keys for communicating information and commands to the processor 600. An output device comprises, for example, a display, a printer, a voice synthesizer, etc. for communicating information to a user.

In some embodiments, one or more operations and/or functionality of the tools and/or systems described with respect to FIGS. 2-5 are realized by the processor 600, which is programmed for performing such operations and/or functionality. One or more of the memory 608, the I/F 602, the storage 606, the I/O device 604, the hardware components 718, and the bus 614 is/are operable to receive instructions, data, design rules, netlists, layouts, models and/or other parameters for processing by the processor 600.

In some embodiments, one or more of the operations and/or functionality of the tools and/or systems described with respect to FIGS. 2-5 is/are implemented by specifically configured hardware (e.g., by one or more application specific integrated circuits (ASICs) which is/are included) separate from or in lieu of the processor 701. Some embodiments incorporate more than one of the described operations and/or functionality in a single ASIC.

In some embodiments, the operations and/or functionality are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Some embodiments have one or a combination of the following features and/or advantages. In some embodiments, a design method performed by a processor is presented. The design method comprises preparing a netlist describing a first circuit extracted from a layout of a second circuit, wherein the first circuit includes the second circuit and parasitic components of the second circuit, and the second circuit includes an active component, obtaining an original electrical characteristic of the active component, wherein an electrical characteristic of the active component is the original electrical characteristic in a condition that the active component has not been operated; obtaining an aged data describing a variation in the original electrical characteristic, wherein the variation is caused by operating the first circuit under a first mode and a second mode different from the first mode during a time period; and providing a simulation result by simulating, based an aged electrical characteristic, the first circuit operating under the first mode and the second mode during the time period, wherein the aged electrical characteristic is a combination of the original electrical characteristic and the variation.

In some embodiments, a design method performed by a processor is presented. The method comprises preparing modes including a first mode and a second mode for operating a first circuit during a time period, the first circuit being extracted from a layout of a second circuit, the first circuit including the second circuit and parasitic components of the second circuit, the second circuit including an active component, and the first mode being different from the second mode; generating a waveform by integrating the first mode and the second mode; obtaining an original electrical characteristic of the active component, wherein an electrical characteristic of the active component is the original electrical characteristic in a condition that the active component has not been operated, obtaining a first aged data describing a first variation in the original electrical characteristic, wherein the first variation is caused by operating, based on the original electrical characteristic, the first circuit under the first mode during the time period, obtaining a second aged data describing a second variation in the original electrical characteristic, wherein the second variation is caused by operating, based on the original electrical characteristic and the first variation, the first circuit under the second mode during the time period; and providing an aged data by simulating, based on the first aged data and the second aged data, the first circuit operating under the first mode and the second mode during the time period, wherein the data describes a variation in the original electrical characteristic, wherein the variation is caused by operating the first circuit under the first mode and the second mode during the time period.

In some embodiments, a semiconductor device design system comprises a processor configured to prepare modes including a first mode and a second mode for operating a first circuit during a time period, the first circuit being extracted from a layout of a second circuit, the first circuit including the second circuit and parasitic components of the second circuit, the second circuit including an active component, and the first mode being different from the second mode; generate a waveform by integrating the first mode and the second mode; obtain an original electrical characteristic of the active component, wherein an electrical characteristic of the active component is the original electrical characteristic in a condition that the active component has not been operated; obtain a first aged data describing a first variation in the original electrical characteristic, wherein the first variation is caused by operating, based on the original electrical characteristic, the first circuit under the first mode during the time period; obtain a second aged data describing a second variation in the original electrical characteristic, wherein the second variation is caused by operating, based on the original electrical characteristic and the first variation, the first circuit under the second mode during the time period; and provide an aged data by simulating, based on the first aged data and the second aged data, the first circuit operating under the first mode and the second mode during the time period, wherein the aged data describes a variation in the original electrical characteristic, wherein the variation is caused by operating the first circuit under the first mode and the second mode during the time period.

The foregoing outlines features of several embodiments so that those skilled in the art may better understand the aspects of the present disclosure. Those skilled in the art should appreciate that they may readily use the present disclosure as a basis for designing or modifying other operations and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor circuit design and manufacture method, comprising:
    preparing a netlist describing a first circuit extracted from a layout of a second circuit, wherein the first circuit includes the second circuit and parasitic components of the second circuit, and the second circuit includes an active component;
    obtaining an original electrical characteristic of the active component, wherein an electrical characteristic of the active component is the original electrical characteristic in a condition that the active component has not been operated;
    obtaining an aged data describing a variation in the original electrical characteristic, wherein the variation is caused by operating the first circuit under a first mode and a second mode different from the first mode during a time period;
    providing a simulation result by simulating, based on an aged electrical characteristic, the first circuit operating under the first mode and the second mode during the time period, wherein the aged electrical characteristic is a combination of the original electrical characteristic and the variation; and
    causing a semiconductor integrated circuit to be fabricated based on the aged data.

2. The semiconductor circuit design and manufacture method of claim 1, further comprising: testing a design of the first circuit with the simulation result.

3. The semiconductor circuit design and manufacture method of claim 1, wherein the first mode includes a first voltage level and the second mode includes a second voltage level lower than the first voltage level.

4. The semiconductor circuit design and manufacture method of claim 1, wherein the first circuit exhibits a first performance when the first circuit operates under the first mode and the second mode, and the first circuit exhibits a second performance when the first circuit operates under a third mode and a fourth mode, wherein the first performance is different from the second performance.

5. The semiconductor circuit design and manufacture method of claim 4, wherein the first performance is worse than the second performance.

6. The semiconductor circuit design and manufacture method of claim 4, wherein the highest voltage level in the first mode and the second mode is higher than that in the third mode and the fourth mode.

7. The semiconductor circuit design and manufacture method of claim 1, further comprising:
storing the aged data describing the variation; and
accessing the aged data in response to a fact that it is desired to simulate an operation of the first circuit under the first mode and the second mode during the time period.

8. The semiconductor circuit design and manufacture method of claim 7, further comprising:
receiving an instruction including an information on a path indicating where to access the aged data describing the variation of the electrical characteristic,
wherein accessing the aged data in response to the fact that it is desired to simulate an operation of the first circuit under the first mode and the second mode during the time period includes:
accessing the aged data describing the variation according to the path.

9. The semiconductor circuit design and manufacture method of claim 1, further comprising:
forming a spice netlist based on the netlist, the original electrical characteristic and the aged data, wherein providing the simulation result by simulating, based on the aged electrical characteristic, the first circuit operating under the first mode and the second mode during the time period includes:
providing the simulation result by simulating, based on the aged electrical characteristic, the first circuit operating under the first mode and the second mode during the first period and the second period, respectively according to the spice netlist.

10. The semiconductor circuit design and manufacture method of claim 1, further comprising:
receiving a first load capacitance value of the first circuit, a second load capacitance vale of the first circuit, a first slew of a voltage in the first mode and the second mode, and a second slew of the voltage in the first mode and the second mode,
wherein providing the simulation result by simulating, based on the aged electrical characteristic, the first circuit operating under the first mode and the second mode during the time period includes:
providing a first simulation result by simulating, based on the first load capacitance value and the first slew, the first circuit operating under the first mode and the second mode during the time period includes;
providing a second simulation result by simulating, based on the first load capacitance value and the second slew, the first circuit operating under the first mode and the second mode during the time period includes;
providing a third simulation result by simulating, based on the second load capacitance value and the first slew, the first circuit operating under the first mode and the second mode during the time period includes; and
providing a fourth simulation result by simulating, based on the second load capacitance value and the second slew, the first circuit operating under the first mode and the second mode during the time period includes; and
testing the design of the first circuit based on the first simulation result;
testing the design of the first circuit based on the second simulation result;
testing the design of the first circuit based on the third simulation result; and
testing the design of the first circuit based on the fourth simulation result.

11. A semiconductor circuit design and manufacture method, comprising:
preparing modes including a first mode and a second mode for operating a first circuit during a time period, the first circuit being extracted from a layout of a second circuit, the first circuit including the second circuit and parasitic components of the second circuit, the second circuit including an active component, and the first mode being different from the second mode;
generating a waveform by integrating the first mode and the second mode;
obtaining an original electrical characteristic of the active component, wherein an electrical characteristic of the active component is the original electrical characteristic in a condition that the active component has not been operated;
obtaining a first aged data describing a first variation in the original electrical characteristic, wherein the first variation is caused by operating, based on the original electrical characteristic, the first circuit under the first mode during the time period;
obtaining a second aged data describing a second variation in the original electrical characteristic, wherein the second variation is caused by operating, based on the original electrical characteristic and the first variation, the first circuit under the second mode during the time period;
providing an aged data by simulating, based on the first aged data and the second aged data, the first circuit operating under the first mode and the second mode during the time period, wherein the aged data describes a variation in the original electrical characteristic, wherein the variation is caused by operating the first circuit under the first mode and the second mode during the time period; and
causing a semiconductor integrated circuit to be fabricated based on the aged data.

12. The semiconductor circuit design and manufacture method of claim 11, further comprising:
providing a simulation result by simulating, based on an aged electrical characteristic, the first circuit operating under the first mode and the second mode during the time period, wherein the aged electrical characteristic is a combination of the original electrical characteristic and the variation; and testing a design of the first circuit with the simulation result.

13. The semiconductor circuit design and manufacture method of claim 11, further comprising:
preparing a netlist describing the first circuit;
determining the amount of input ports of the first circuit according to the netlist,
wherein generating the waveform by integrating the first mode and the second mode includes:
generating the same amount of waveforms as the amount of input ports.

14. The semiconductor circuit design and manufacture method of claim 11, further comprising:
preparing a netlist describing the first circuit including a first input port and a second input port;
wherein generating the waveform by integrating the first mode and the second mode includes:
generating a first waveform and a second waveform;
wherein providing the aged data by simulating, based on the first aged data and the second aged data, the first circuit operating under the first mode and the second mode during the time period includes:
providing the aged data by simulating, based on the first waveform fed into the first input port and the second waveform fed into the second input port, the first circuit operating under the first mode and the second mode during the time period.

15. The semiconductor circuit design and manufacture method of claim 14, wherein generating the first waveform and the second waveform includes:
generating the first waveform by integrating the first mode and the second mode; and
generating the second waveform by dividing the first waveform.

16. The semiconductor circuit design and manufacture method of claim 11, wherein the first mode includes a first operation voltage and a first operation ratio in a time axis, preparing the first aged data describing the first variation in the original electrical characteristic including:
preparing the first aged data describing the first variation according to all of the first operation voltage, the first operation ratio and the time period.

17. The semiconductor circuit design and manufacture method of claim 11, wherein the first circuit exhibits a first performance when the first circuit operates under the first mode and the second mode, and the first circuit exhibits a second performance when the first circuit operates under a third mode and a fourth mode,
wherein the first performance is different from the second performance.

18. The semiconductor circuit design and manufacture method of claim 17, wherein the first performance is worse than the second performance.

19. The semiconductor circuit design and manufacture method of claim 18, wherein the highest voltage level in the first mode and the second mode is higher than that in the third mode and the fourth mode.

20. A system for designing and implementing an integrated circuit, comprising:
a processor configured to:
prepare modes including a first mode and a second mode for operating a first circuit during a time period, the first circuit being extracted from a layout of a second circuit, the first circuit including the second circuit and parasitic components of the second circuit, the second circuit including an active component, and the first mode being different from the second mode;
generate a waveform by integrating the first mode and the second mode;
obtain an original electrical characteristic of the active component, wherein an electrical characteristic of the active component is the original electrical characteristic in a condition that the active component has not been operated;
obtain a first aged data describing a first variation in the original electrical characteristic, wherein the first variation is caused by operating, based on the original electrical characteristic, the first circuit under the first mode during the time period;
prepare a second aged data describing a second variation in the original electrical characteristic, wherein the second variation is caused by operating, based on the original electrical characteristic and the first variation, the first circuit under the second mode during the time period; and
provide an aged data by simulating, based on the first data and the second data, the first circuit operating under the first mode and the second mode during the time period, wherein the aged data describes a variation in the original electrical characteristic, wherein the variation is caused by operating the first circuit under the first mode and the second mode during the time period,
wherein the processor is configured to apply the aged data so as to effect a physical implementation of the integrated circuit.

* * * * *